(12) United States Patent
Du et al.

(10) Patent No.: US 11,389,025 B2
(45) Date of Patent: Jul. 19, 2022

(54) ELECTRIC ROASTING MACHINE

(71) Applicant: FOSHAN SHUNDE MIDEA ELECTRICAL HEATING APPLIANCES MANUFACTURING CO., LTD., Foshan (CN)

(72) Inventors: Jianrong Du, Foshan (CN); Guoyao Zhao, Foshan (CN); Minghui Du, Foshan (CN); Jiequan Huang, Foshan (CN); Yan She, Foshan (CN); Yuhua Huang, Foshan (CN); Pingying Han, Foshan (CN); Xiubao Lin, Foshan (CN); Wenxiu Zhou, Foshan (CN); Haitao Li, Foshan (CN); Gang Wang, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 618 days.

(21) Appl. No.: 16/343,338

(22) PCT Filed: Jul. 4, 2017

(86) PCT No.: PCT/CN2017/091714
§ 371 (c)(1),
(2) Date: Apr. 18, 2019

(87) PCT Pub. No.: WO2018/072475
PCT Pub. Date: Apr. 26, 2018

(65) Prior Publication Data
US 2019/0254475 A1   Aug. 22, 2019

(30) Foreign Application Priority Data

Oct. 18, 2016  (CN) .......................... 201610910148.8
Oct. 18, 2016  (CN) .......................... 201621134202.6
(Continued)

(51) Int. Cl.
*A47J 37/06*   (2006.01)
*A47J 37/00*   (2006.01)

(52) U.S. Cl.
CPC ........... *A47J 37/0635* (2013.01); *A47J 37/00* (2013.01); *A47J 37/06* (2013.01)

(58) Field of Classification Search
CPC ............... A47J 37/0629; A47J 37/6635; A47J 37/0641; A47J 37/0709
(Continued)

(56) References Cited

U.S. PATENT DOCUMENTS 6,899,019 B2    5/2005   Han et al.
2004/0069150 A1 4/2004   Han et al.
(Continued)

FOREIGN PATENT DOCUMENTS

AU   2003213336 A1   9/2003
CN      1488309 A    4/2004
(Continued)

OTHER PUBLICATIONS

World Intellectual Property Organization (WIPO) International Search Report PCT/CN2017/091714 dated Oct. 13, 2017 8 Pages.
(Continued)

*Primary Examiner* — Tu B Hoang
*Assistant Examiner* — Thomas J Ward
(74) *Attorney, Agent, or Firm* — Anova Law Group, PLLC

(57) ABSTRACT

An electric roasting machine includes an outer housing, a heating device accommodated in the outer housing, and an
(Continued)

inner housing between the outer housing and the heating device. A heat insulating cavity is formed between the inner housing and the heating device. A heat dissipating passage is formed between the outer housing and the inner housing.

19 Claims, 7 Drawing Sheets

(30) Foreign Application Priority Data

| Oct. 18, 2016 | (CN) | 201621134526.X |
|---|---|---|
| Oct. 18, 2016 | (CN) | 201621134563.0 |
| Oct. 18, 2016 | (CN) | 201621137760.8 |
| Oct. 18, 2016 | (CN) | 201621137996.1 |

(58) Field of Classification Search
USPC ...... 219/449.1, 452.11, 452.12; 99/339, 358, 99/376
See application file for complete search history.

(56) References Cited

U.S. PATENT DOCUMENTS

| 2004/0154609 | A1* | 8/2004 | Han | A47J 37/0709 126/41 R |
|---|---|---|---|---|
| 2006/0151471 | A1* | 7/2006 | Jang | A47J 37/0709 219/450.1 |
| 2011/0084057 | A1* | 4/2011 | Lin | A47J 37/0709 219/450.1 |
| 2016/0227964 | A1 | 8/2016 | Van et al. | |

FOREIGN PATENT DOCUMENTS

| CN | 1518941 | A | 8/2004 |
|---|---|---|---|
| CN | 201641677 | U | 11/2010 |
| CN | 203586320 | U | 5/2014 |
| CN | 204105778 | U | 1/2015 |
| CN | 105578936 | A | 5/2016 |
| CN | 206102455 | U | 4/2017 |
| CN | 206284929 | U | 6/2017 |
| CN | 206284930 | U | 6/2017 |
| CN | 206284931 | U | 6/2017 |
| CN | 206284932 | U | 6/2017 |
| CN | 206284933 | U | 6/2017 |
| CN | 206284934 | U | 6/2017 |
| CN | 206333783 | U | 7/2017 |
| CN | 206354919 | U | 7/2017 |
| CN | 206462871 | U | 9/2017 |
| CN | 206462872 | U | 9/2017 |
| JP | 2002340345 | A | 11/2002 |
| KR | 20120058944 | A | 6/2012 |
| KR | 20120122685 | A | 11/2012 |
| KR | 20150019454 | A | 2/2015 |

OTHER PUBLICATIONS

World Intellectual Property Organization (WIPO) International Search Report PCT/CN2017/091717 dated Oct. 13, 2017 8 Pages.
World Intellectual Property Organization (WIPO) Written Opinion for PCT/CN2017/091714 with translation dated Oct. 13, 2017 9 Pages.
World Intellectual Property Organization (WIPO) Written Opinion for PCT/CN2017/091717 with translation dated Oct. 13, 2017 9 Pages.

* cited by examiner

ELECTRIC ROASTING MACHINE

FIELD

The present application relates to the technical field of cooker, and in particular, relates to an electric roasting machine.

BACKGROUND

Electric roasting machine heats food contactlessly by heat radiation, and the food roasted by the machine would not be burnt, and are fresh and tender. Additionally, little cooking fume is generated during roasting. Thereby, it has become a favorite of consumers.

However, the heat radiation device that generates heat radiation also radiates part of the heat to the outer housing of the electric roasting machine, which results in the increase of the temperature of the outer housing of the electric roasting machine, thus users may be hurt. In addition, part of the heat is lost, and the food heating efficiency of the electric roasting machine is decreased.

SUMMARY

The main purpose of the present application is to provide an electric roasting machine, which aims to reduce heat loss of the electric roasting machine during roasting, improve the heating efficiency of the electric roasting machine, and avoid increasing of temperature of the outer housing.

In order to achieve the above purpose, the electric roasting machine provided by the present application includes an outer housing, an inner housing, and a heating device, both the inner housing and a heating device are accommodated in the outer housing, the inner housing is arranged between the outer housing and the heating device, and the inner housing cooperates with the heating device to form a heat insulating cavity.

In one embodiment, the heating device is located within the height range of the heat insulating cavity.

In one embodiment, the heat insulating cavity is a cavity formed by a metal material and having a closed upper end.

In one embodiment, the heating device includes a reflecting cover, and a radiant heat source installed in the reflecting cover, the reflecting cover forms a reflecting cavity, the radiant heat source is positioned in the reflecting cavity, and one side wall of the reflecting cover facing away from the radiant heat source cooperates with the inner housing to form the heat insulating cavity.

In one embodiment, a surface of the inner housing facing the reflecting cover is coated with a reflecting layer, and the reflecting layer is a galvanized layer or an aluminized layer.

In one embodiment, the heating device further includes a protecting window, the reflecting cavity includes a first avoiding opening, the protecting window covers the first avoiding opening and cooperates with the reflecting cover to form a closed space.

In one embodiment, the inner housing includes two long sides, and there are two heating devices, each of the heating devices is installed on one of the long sides, and each of the heating devices extends along the length direction of the corresponding long side.

In one embodiment, a heat dissipating passage is formed between the outer housing and the inner housing.

In one embodiment, the distance d between the outer housing and the inner housing is longer than or equal to 3 millimeters and shorter than or equal to 30 millimeters.

In one embodiment, the upper end of the heat dissipating passage includes an air outlet.

In one embodiment, the inner housing includes a horizontal section, and a bent section which is connected with the horizontal section, the outer housing includes a cover section, and a inclined section which is connected with the inclined section, the horizontal section is arranged opposite to the cover section, the bent section is arranged opposite to the inclined section, and the distance between the horizontal section and the cover section is smaller than the distance between the bent section and the inclined section.

In one embodiment, an included angle between the inclined section and the vertical plane ranges from 5 degrees to 30 degrees.

In one embodiment, the electric roasting machine also includes a bottom housing, the bottom housing connects with the lower ends of the outer housing and the inner housing by covering, the bottom housing includes an air inlet to communicate with the heat dissipating passage, and the upper end of the outer housing includes an air outlet to communicate with the heat dissipating passage.

In one embodiment, the air outlet is located at one side of the outer housing close to the inner housing.

In one embodiment, the cross-sectional area of the heat dissipating passage near the air inlet is larger than the cross-sectional area of the heat dissipating passage near the air outlet.

In one embodiment, the electric roasting machine includes a plurality of air inlets which are below the heating device, the plurality of the air inlets are arranged at intervals along the length direction of the heating device, and the projection of the plurality of air inlets on the horizontal plane at least partially overlaps with the projection of the heating device on the horizontal plane.

In one embodiment, the length of the arrangement range of the air inlets below the heating device is configured to be L1, and the length of the heating device is configured to be L2, and the ratio of L1 to L2 is larger than or equal to 0.5 and smaller than or equal to 1.1.

In one embodiment, the electric roasting machine further includes a grill, a second avoiding opening is formed at the upper end of the inner housing, the grill is supported at the second avoiding opening, and the grill is partially accommodated in the second avoiding opening.

In one embodiment, the inner housing includes a grill supporting portion at the second avoiding opening, and the upper end surface of the grill supporting portion is higher than the upper end surface of the outer housing.

In one embodiment, the electric roasting machine includes a plurality of grill supporting portions, which are arranged at intervals and surround the second avoiding opening, and an airflow passage is formed between two adjacent grill supporting portions.

In one embodiment, the height difference between the upper end surface of the grill supporting portion and the upper end surface of the outer housing is greater than 0 and less than or equal to 10 millimeters.

In one embodiment, the electric roasting machine further includes an oil drip pan, the oil drip pan is arranged directly below the grill, and the projection area of the oil drip pan on the horizontal plane is approximately equal to the projection area of the grill on the horizontal plane.

According to the technical solutions of the present application, a heat insulating cavity is formed between the heating device and the inner housing of the electric roasting machine, and in the process of heating food by the electric roasting machine through the isolation effect of the heat insulating cavity, the radiative conduction of the heat generated by the heating device and the heat from the grill to the outside of the electric roasting machine is greatly reduced by the heat insulating cavity, so that heat loss of the electric roasting machine during heating food is reduced, the food heating efficiency of the electric roasting machine is improved, the temperature of the outer housing is also decreased, and scalding when a user touches the outer housing can be avoided, which is safer for users to use the electric roasting machine.

BRIEF DESCRIPTION OF THE DRAWINGS

To illustrate the technical solutions according to the embodiments of the present application or in the existing technologies more clearly, the accompanying drawings for describing the embodiments or the existing technologies are briefly described in the following. Apparently, the accompanying drawings in the following description are only about some embodiments of the present application, and persons of ordinary skill in the art can derive other drawings from the accompanying drawings without creative efforts.

DESCRIPTION OF REFERENCE NUMERALS

Figure 1:
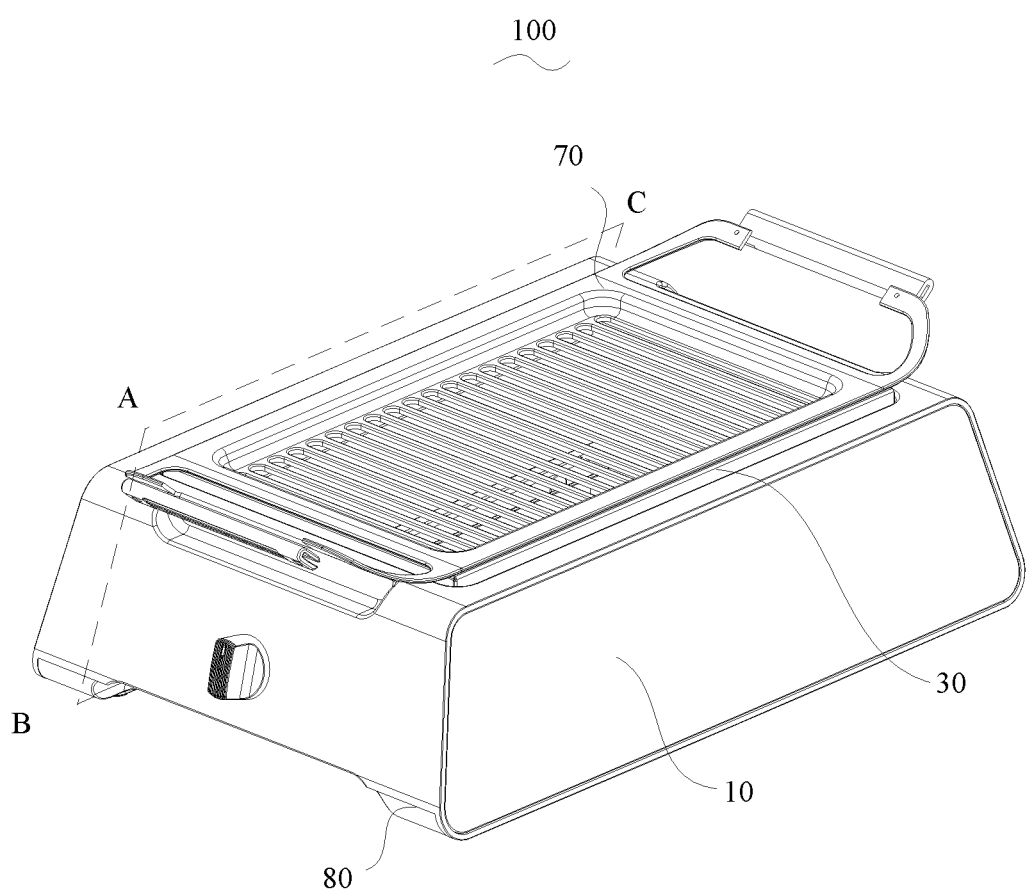
FIG. 1 is a perspective view of an electric roasting machine in one embodiment of the present application.

| Reference numeral | Name | Reference numeral | Name |
|---|---|---|---|
| 100 | Electric roasting machine | 35 | Grill supporting portion |
| 10 | Outer housing | 37 | Airflow passage |
| 12 | cover section | 50 | Heating device |
| 14 | inclined section | 51 | Reflecting cover |
| 20 | Heat dissipating passage | 53 | Radiant heat source |
| 22 | Air inlet | 55 | Reflecting cavity |
| 24 | Air outlet | 57 | protecting window |
| 30 | Inner housing | 60 | Heat insulating cavity |
| 31 | Accommodating cavity | 70 | grill |
| 32 | Horizontal section | 71 | Guiding slope |
| 33 | Abutting slope | 80 | Bottom housing |
| 34 | bent section | 90 | Oil drip pan |

The realization of the objectives, functional characteristics and advantages of the present application will be further explained with reference to the attached drawings in combination with embodiments.

DETAILED DESCRIPTION OF THE EMBODIMENTS

The technical solutions of the embodiments of the present application will be clearly and completely described in the following with reference to the accompanying drawings. It is obvious that the embodiments to be described are only some rather than all of the embodiments of the present application. All other embodiments obtained by persons skilled in the art based on the embodiments of the present application without creative efforts shall fall within the protection scope of the present application.

It is to be understood that, all of the directional terms (such as top, down, left, right, front, back . . . ) in the exemplary embodiments of the present disclosure are only intended for explaining relative position relations, moving condition of the elements at a specific attitude (referring to figures), and so on. If the specific attitude changes, the directional term changes accordingly.

In the present application, the terms "connect" and "fix", and the like may be broadly understood unless explicitly specified and limited otherwise. For example, "fix," unless otherwise specified, may refer to a fixed connection, a detachable connection, or an integral part; it may be mechanical connection or electrical connection; it may be direct connection or indirect connection through a medium, or it may be the communication between two components or the interaction between two components. For those of ordinary skill in the art, the specific meanings of the above terms in the present application may be understood according to specific situations.

In addition, the present application involves descriptions such as "first", "second", etc., which are only intended for descriptive purposes, and should not be understood as indicating or suggesting relative importance or impliedly indicating the number of the indicated technical character. Therefore, the character indicated by "first", "second" can express or impliedly include at least one character. In addition, the technical solutions of various embodiments may be combined with each other, but such combination shall be realizable by those having ordinary skill in the art. When conflict occurs in a combination of the technical solutions or a combination cannot be realized, it should be considered that such combination does not existed, and is not within the protection scope of the claims of by the present application.

The present application provides an electric roasting machine 100.

Figure 2:
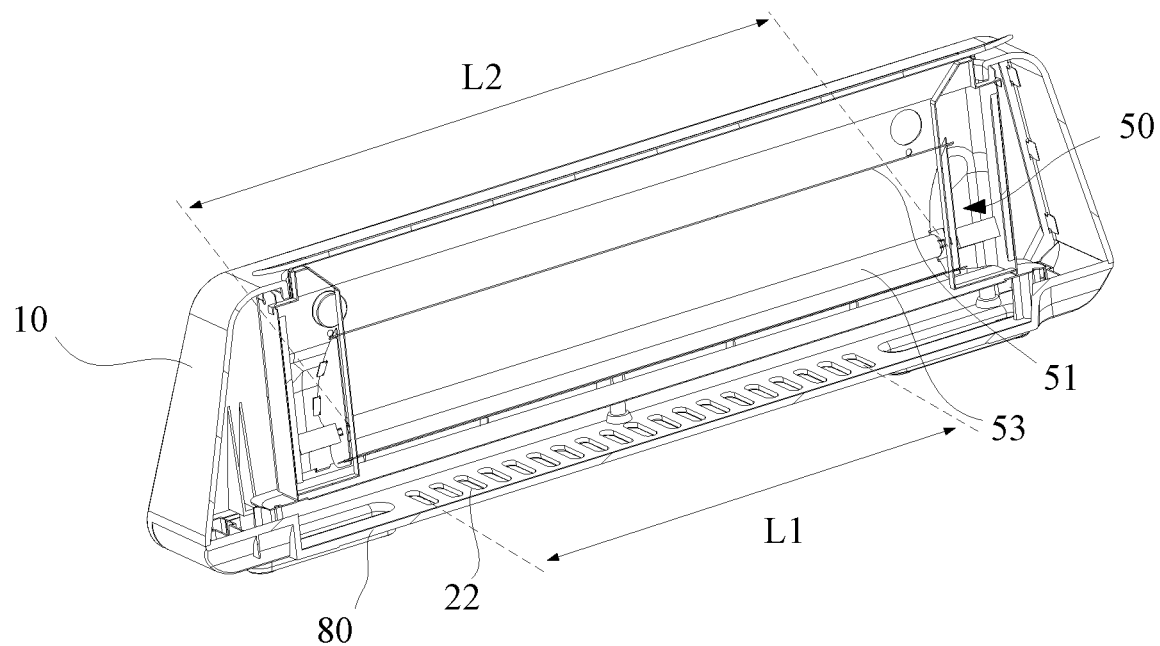
FIG. 2 is a cross-sectional view of A-B-C section of the electric roasting machine shown in FIG. 1.
Figure 3:
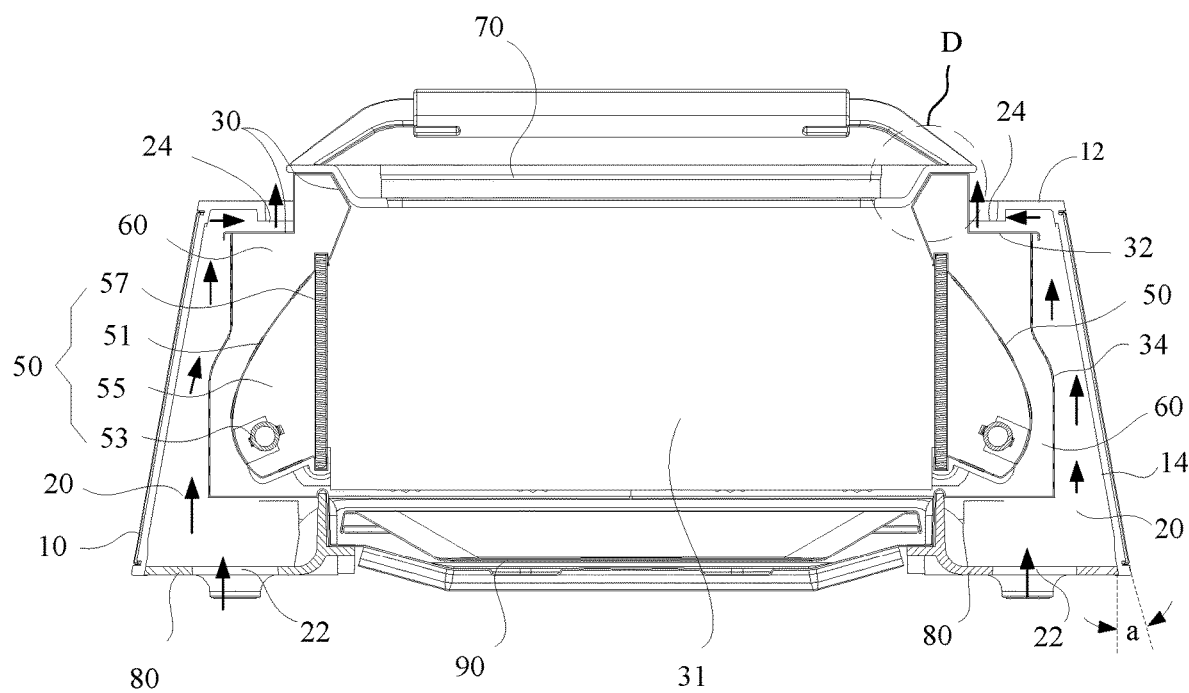
FIG. 3 is a cross-sectional view of the electric roasting machine shown in FIG. 1.

Referring to FIGS. 1 to 3, in one embodiment of the present application, the electric roasting machine 100 includes an outer housing 10, an inner housing 30, and a heating device 50, both the inner housing 30 and the heating device 50 are accommodated in the outer housing 10, the inner housing 30 is arranged between the outer housing 10 and the heating device 50, and the inner housing 30 cooperates with the heating device 50 to form a heat insulating cavity 60.

The outer housing 10 of the present application is made of plastic material and is produced by integral injection molding. The inner housing 30 may be made of stainless steel or aluminum alloy. The outer housing 10 is shaped as a rectangular frame with openings at the upper and lower ends, and the inner housing 30 and the heating device 50 are both arranged in the space enclosed by the outer housing 10. The inner housing 30 also has a frame structure, the shape of the inner housing 30 matches the shape of the outer housing 10, the outer housing is sleeved outside on the inner housing 30. The inner housing 30 may be formed by splicing a plurality of metal plates end to end. According to the electric roasting machine 100 of the present application, the bottoms of the outer housing 10 and the inner housing 30 are connected with a bottom housing 80, the bottom housing 80 is slidably connected with an oil drip pan 90, and a grill 70 is supported on the upper end of the metal outer housing 10. During the operation of the electric roasting machine 100, the heating device 50 radiates heating light toward the grill 70 to heat food placed on the grill 70 without contact. During the heating process of food such as meat, the grease generated by the food may drop onto the oil drip pan 90, and of course, water carried by food may also drop onto the oil drip pan 90 to be collected by the oil drip pan 90. As the oil drip pan 90 and the bottom housing 80 are in sliding connection, the oil drip pan 90 may be pulled out at one side of the electric roasting machine 100, making it convenient to clean the oil stain on the oil drip pan 90.

According to the technical solution of the present application, a heat insulating cavity 60 is formed between the heating device 50 and the inner housing 30 of the electric roasting machine 100. During process of the electric roasting machine 100 heating food, the radiation and conduction of the heat generated by the heating device 50 towards the outside of the electric roasting machine 50 is greatly reduced due to the heat insulating cavity 60 acting as an air insulation layer. Thereby, the heat loss of the heating device 50 is reduced, thus the food heating efficiency of the heating device 50 is improved, and the temperature of the outer housing 10 is decreased. Thereby, the risk of scald when touching the outer housing 10 of the electric roasting machine 100 is reduced, and a user also would not feel too hot when being near the electric roasting machine 100, making the use effect of the electric roasting machine 100 better.

It can be understood that the heat insulating cavity 60 of this embodiment may be a closed cavity or a cavity having an opening, and a closed cavity is preferred. When the heat insulating cavity 60 has an opening, the opening can be formed at the lower part of the inner housing 30, while both the upper parts of the inner housing 30 and the heating device 50 are closed.

In order to improve the heat insulating performance of the electric roasting machine 100, the heating device 50 is located within the height range of the heat insulating cavity 60. In this way, the outer wall of the heating device 50 is covered by the heat insulating cavity 60. According to the present application, the heat insulating cavity 60 completely covers the outer wall of the heating device 50 facing the housing 10, thus better isolating the heat radiated by the heating device 50 towards the housing 10, and making the heat insulating effect of the electric roasting machine 100 better.

Referring to FIG. 3, the heating device 50 includes a reflecting cover 51 and a radiant heat source 53 installed on the reflecting cover 51, the reflecting cover 51 forms a reflecting cavity 55, the radiant heat source 53 is located in the reflecting cavity 55, the periphery of the reflecting cover 51 abuts the inner housing 30, and the outer wall of the reflecting cover 51 facing away from the radiant heat source 53 cooperates with the inner housing 30 to form a heat insulating cavity 60.

According to the present application, the heating device 50 heats food by radiating heat from a radiant heat source 53, which is an infrared lamp tube. As a whole, the cavity of the reflecting cavity 55 formed by the reflecting cover 51 is slant upward, and the upper part of the reflecting cavity 55 includes a first avoiding opening (not labeled), so that the heat radiated by the radiant heat source 53 is guided to the grill 70 supported on the upper end of the inner housing 30, and non-contact heating of food on the grill 70 is realized. The reflecting cover 51 may have a structure including a base made of a metal material (such as aluminum alloy) and a reflecting material layer (such as a galvanized layer) covered on the surface of the base facing the radiant heat source 53. The reflecting cover 51 may be an integral plate-like structure formed by bending, or the reflecting cover 51 may be formed by splicing a plurality of plates. The radiant heat source 53 of this embodiment may be replaced by a halogen lamp, a coil type filament, a ceramic heater, or the like.

It can be understood that in this embodiment, a sealing ring may also be provided at the joint of the reflecting cover 51 and the inner housing 30, and the sealing ring may be made of a plastic material that may resist high temperature, thus forming a flexible buffer at the joint of the heating device 50 and the inner housing 30. Thereby, the heating device 50 with the radiant heat source 53 would not be damaged due to collision during the transportation of the electric roasting machine 100, and the heat insulating cavity 50 may be better sealed, the heat transferred from the reflecting cover 51 to the inner housing 30 through contact is also reduced, thus the heat radiated by the electric roasting machine 100 in directions other than the direction of the grill 70 is further reduced, the heat utilization rate and heating effect of the electric roasting machine 100 are further improved.

In this embodiment, the outer wall of the reflecting cover 51 cooperates with the inner housing 30 to form the heat insulating cavity 60, thus preventing the heating device 50 from radiating heat toward the outer housing 10. Such structure is simple, and the heating efficiency of the electric roasting machine 100 is also improved.

In order to further reduce the loss caused by heat radiation of the electric roasting machine 100 toward the housing 10, and improve the heating efficiency of the electric roasting machine 100, in this embodiment, a surface of the inner housing 30 facing the reflecting cover 51 is coated with a reflecting layer (not labeled in the figures), and the reflecting layer is a galvanized layer or an aluminized layer.

By coating a reflective layer on the surface of the inner housing 30 facing the reflecting cover 51, the heat radiated by the heating device 50 toward the outer housing 10 may be reflected back by the inner housing 30, which is equivalent to adding an additional reflecting cover on top of the heat insulating cavity 60. Thereby, the heat loss is further reduced and the heating efficiency of the electric roasting machine 100 is improved.

In this embodiment, the heating device 50 also includes a protecting window 57, which covers the first avoiding opening and cooperates with the reflecting cover 51 to form a closed space.

The protecting window 57 is preferably made of glass. In one aspect, the protecting window 57 may filter the light emitted by the radiant heat source 53 (e.g., ultraviolet rays) to reduce damage to human body caused by harmful light emitted by the radiant heat source 53, thus improving the safety of the electric roasting machine 100. In another aspect, the protecting window 57 cooperates with the reflecting cover 51 to form a closed space, and the radiant heat source 53 is arranged in a closed environment. During heating of food, oil drops or moisture that drop onto the oil drip pan 90 may not splash onto the radiant heat source 53, thus avoiding corrosion of the radiant heat source 53 caused by the oil drops or moisture, and improving the service life of the electric roasting machine 100.

From the above, it can be seen that the inner housing 30 is a frame structure adapted to the outer housing 10. The inner housing 30 includes two long sides, and there are two heating devices 50, each of the heating devices 50 is installed on one of the long sides, and each of the heating devices 50 extends along the length direction of the corresponding long side. The inner housing 30 cooperates with the two heating devices 50 to form an accommodating cavity 31, and the two heating devices 50 are respectively positioned at two opposite sides in the accommodating cavity 31.

According to the electric roasting machine 100 of the present application, through the two oppositely arranged heating devices 50, the food on the grill 70 is heated at two opposite sides simultaneously, thus being heated evenly, and the roasted food has a good quality. Besides, the efficiency of heating food is improved.

Referring to FIG. 3, the upper end of the inner housing 30 or the upper end of the reflecting cover 51 includes a second avoiding opening (not labeled in the figures), the grill 70 is supported at the second avoiding opening, and the grill 70 is partially embedded in the second avoiding opening. By partially embedding the grill 70 in the second avoiding opening, in one aspect, the structural stability of the grill 70 after being installed may be improved; in another aspect, the heat insulating cavity 60 extends to two sides of the grill 70, so that the heat insulating cavity 60 encloses the two sides of the plane where the grill 70 is located. Thereby the transfer of heat from the grill 70 to the outer housing 10 is reduced, and the heat radiated by the two heating devices 50 is more concentrated on the grill 70, thus further improving the heating efficiency of food on the grill 70.

In this embodiment, the inner housing 30 that participates in forming the heat insulating cavity 60 is made of mental material, so is the side walls of the reflecting cover 51 of the heating device 50. That is, the heat insulating cavity 60 is formed by metal materials, and has a closed upper end. Then in the process of heating food by the electric roasting machine 100, hot air in the heat insulating cavity 60 rises under the heating by the heating device 50, and more heat is concentrated at the upper end of the heat insulating cavity 60. Further, the grill 70 is supported at the second avoiding opening and close to the upper end of the heat insulating cavity 60. As such, during operation of the electric roasting machine 100, the temperature at the upper end of the heat insulating cavity 60 may be close to the temperature of the grill 70, and hence the temperature difference between the grill 70 and the heat insulating cavity 60 is small, thereby the heat loss of the grill 70 caused by heat transfer through the top of the heat insulating cavity 60 is reduced. Accordingly, the heat utilization rate and the heating effect of the electric roasting machine 100 are improved.

Figure 4:
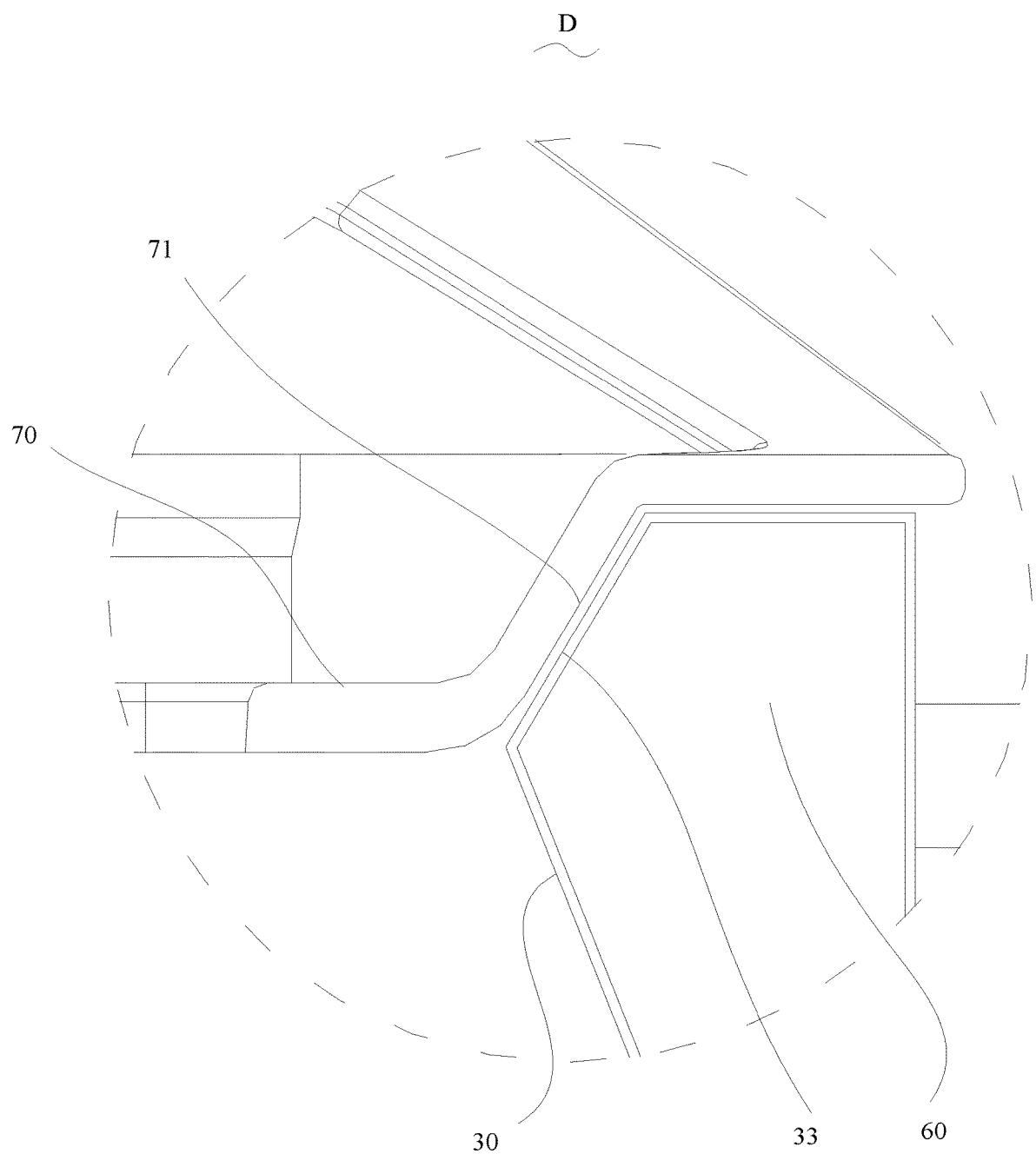
FIG. 4 is an enlarged schematic view of the portion marked with "D" of the electric roasting machine shown in FIG. 3.

Referring to FIGS. 3 and 4, the inner housing 30 or the reflecting cover 51 includes an abutting slope 33 at the second avoiding opening (in this embodiment, the inner housing 30 includes the abutting slope 33), and the grill 70 includes a guiding slope 71. When the grill 70 is partially embedded in the second avoiding opening, the abutting slope 33 is parallel to the guiding slope 71, or abuts the guiding slope 71.

According to this embodiment, due to the cooperation of the abutting slope 33 and the guiding slope 71, the structure can be more stable when the grill 70 is installed at the upper end opening of the inner housing 30, and the alignment is more convenient during the installation. Further, since the abutting slope 33 abuts the guiding slope 71, the part of the inner housing 30 that corresponds to the abutting slope 33 generates heat under the irradiation of the heat radiation ray from the radiant heat source 53, and the heat is transferred to the periphery of the grill 70 through the guiding slope 71. Thus, the food at the periphery of the grill 70 may also be heated at a higher temperature, and the effect of heating the food on the grill 70 is better, and the heating efficiency is higher.

When the abutting slope 33 is parallel to the guiding slope 71, the distance between the abutting slope 33 and the guiding slope 71 in this embodiment is greater than 0 and less than or equal to 3 millimeters. In this way, the assembled structure of the grill 70 is firmer, and the heat conductivity is further improved.

In the above contents, according to the embodiment of the present application, the inner housing 30 cooperates with the heating device 50 to form a heat insulating cavity 60 between them, so as to reduce the heat loss caused by the radiation of the heating device 50 toward the outer housing 10, thus to improve the heat utilization rat, and to reduce the temperature of the outer housing 10, which makes the electric roasting machine 100 of the present application safe to use. In order to further improve the use safety of the electric roasting machine 100, the following design is also carried out to reduce the temperature of the housing 10.

Specifically, please refer to FIGS. 1 to 3 again. According to the present application, a heat dissipating passage 20 is formed between the outer housing 10 and the inner housing 30. According to the technical solutions of the present application, a heat dissipating passage 20 is formed between the outer housing 10 and the inner housing 30 of the electric roasting machine 100. During heating food by the electric roasting machine 100, the heating device 50 radiates heat toward the outer housing 10. Specifically, the heating device 50 transfers the heat to the inner housing 30, and the heat on the side surface of the inner housing 30 that faces the outer housing 10 is carried away by air convection in the heat dissipating passage 20, and only a small amount of heat may be transferred to the outer housing 10, so that the outer housing 10 may be prevented from overheating during the operation of the electric roasting machine 100. Thereby, in one aspect, deformation and degradation of the outer housing 10 due to high temperature may be avoided, in another aspect, users may also be kept away from scald when touch the outer housing 10, the safety of the electric roasting machine is improved thereby.

In this embodiment, the upper end of the heat dissipating passage 20 includes an air outlet 24, and the air outlet 24 is close to one side of the outer housing 10 near the inner housing 30. Specifically, the bottom housing 80 covers and connects with the lower ends of the outer housing 10 and the inner housing 30, the bottom housing 80 includes an air inlet 22 communicating with the heat dissipating passage 20, and the upper end of the outer housing 10 includes an air outlet 24 communicating with the heat dissipating passage 20, i.e., the air outlet 24 is arranged at one side of the outer housing 10 close to the inner housing 30.

During the operation of the electric roasting machine 100, the airflow in the heat dissipating passage 20 is from bottom to top, and the air that enters the heat dissipating passage 20 is blown out from the side of the electric roasting machine 100 to the top. By taking in air from the bottom, the small amount of oil fume generated in roasting food on the grill 70 may be prevented from entering the dissipating passage 20 through the air inlet 22, which may cause the inner walls of the dissipating passage 20 to be covered with oil stain and difficult to clean. And, according to the roasting machine 100 of the present application, an outer housing 10, an inner housing 30, and a bottom housing 80 cooperates to form a dissipating passage 20, resulting in a detachable structure. Thereby, it is more convenient for later disassembly and maintenance of the roasting machine 100.

Further, according to the present application, the distance between the inner housing 30 and the outer housing 10 is set to be 3 to 30 millimeters. During heating food by the electric roasting machine 100, when the heat generated by the heating device 50 radiates toward the outer housing 10 through the inner housing 30, the heat transfer from the inner housing 30 to the outer housing 10 is greatly reduced due to the distance between the inner housing 30 and the outer housing 10, and the outer housing 10 may not heat up excessively during the operation of the electric roasting machine. Thereby, deformation and degradation of the outer housing 10 due to high temperature may be avoided, and users may also be kept away from scald when touch the outer housing 10, thereby the safety of the electric roasting machine is improved. In addition, the distance between the inner housing 30 and the outer housing 10 is set to be 3 to 30 millimeters to make the overall structure of the electric roasting machine 100 compact.

Specifically, in this embodiment, the inner housing 30 includes a horizontal section 32 and a bent section 34 connected to each other. The outer housing 10 includes a cover section 12 and a inclined section 14 connected to each other. The horizontal section 32 and the cover section 12 are arranged opposite to each other, and the bent section 34 and the inclined section 14 are arranged opposite to each other. The distance between the horizontal section 32 and the cover section 12 is smaller than the distance between the bent section 34 and the inclined section 14.

In this embodiment, the horizontal section 32 and the bent section 34 of the inner housing 30 are the middle parts of the inner housing 30, and the horizontal section 32 is located above the bent section 34. The inner housing 30 also includes plate parts connected with the horizontal section 32 and the bent section 34 respectively, so that the whole inner housing 30 is in the shape of a cover with an approximately rectangular opening, that is, the horizontal section 32 and the bent section 34 are the middle parts of the cover. The horizontal section 32 cooperates with the bent section 34 to form the above-mentioned long side to adapt to the heating device 50. The outer housing 10 is also formed by the cover section 12 and the inclined section 14 as a cover shape with an approximately rectangular opening. And the lateral part of the body of the electric roasting machine 100 corresponding to the bent section 34 and the inclined section 14 has a larger area. During the heating of the electric roasting machine 100, the heat generated by the heating device 50 that radiates towards the outer housing 10 is mostly transferred via the bent section 34 and the inclined section 14. In this embodiment, by setting the distance between the bent section 34 and the inclined section 14 as relatively large, the heat transfer from the bent section 34 to the inclined section 14 is reduced, and the temperature of the housing 10 may not rise dramatically.

An included angle between the inclined section 14 and the vertical plane ranges from 5 to 30 degrees. In this embodiment, the inclined section 14 inclines toward the inside of the electric roasting machine 100, so that the electric roasting machine 100 has a trapezoidal cross section as a whole, as a result, a user is less likely to touch the housing 10 while using the electric roasting machine 100.

In order to achieve a better heat dissipation effect, the cross-sectional area of the heat dissipating passage 20 near the air inlet 22 is larger than the cross-sectional area of the heat dissipating passage near the air outlet 24. A large amount of air enters the heat dissipating passage 20 from the air inlet 22 since hot air tends to move upward, and the air flow rate in the heat dissipating passage 20 is raised by the constriction along the direction from the air inlet 22 to the air outlet 24, during food heating of the electric roasting machine 100. Thereby, the heat dissipation effect is better.

Further, a dust proof (not shown) can be provided at the air inlet 22 and/or the air outlet 24. Through the dust proof, foreign matters may be prevented from entering the heat dissipating passage 20, which is more favorable for keeping the heat dissipating passage 20 clean.

Further, a plurality of air inlets 22 on the bottom housing 20 are arranged along the length direction of the heating device 50, the length of the range of arrangement of the air inlets 22 below the heating device is configured to be L1, and the length of the heating device 50 is configured to be L2, and the ratio of L1 to L2 is larger than or equal to 0.5 and smaller than or equal to 1.1.

According to the technical solutions of the present application, the outer housing 30 of the electric roasting machine 100 cooperates with the inner housing 10 of the electric roasting machine 100 to form the heat dissipating passage 20, and a plurality of air inlets 22 communicating with the heat dissipating passage 20 are formed in the bottom housing 80, and the plurality of air inlets 22 are linearly arranged in the length direction of the heating device 50. The ratio of the arrangement length L1 of the plurality of air inlets 22 to the length L2 of the heating device 50 is set to be larger than or equal to 0.5 and smaller than or equal to 1.1, i.e., $0.5 \leq L1/L2 \leq 1.1$. Thereby, the plurality of the air inlets 22 may meet the requirements of heat dissipation and air inlet during the heating of the electric roasting machine 100, so as to prevent the outer housing 10 from overheating. Thereby, in one aspect, deformation and degradation of the outer housing 10 due to high temperature may be avoided; in another aspect, users may also be kept away from scald when touching the outer housing 10, and the safety of the electric roasting machine is improved thereby.

Preferably, the projection of the plurality of air inlets 22 on the horizontal plane at least partially overlaps with the projection of the heating device 50 on the horizontal plane. In this way, the cold air entering the heat dissipating passage 20 from the air inlets 22 and moving upward can quickly and relatively completely absorb the heat transferred from the heating device 50 to the inner housing 30, and the air is discharged through the air outlets 24.

Figure 6:
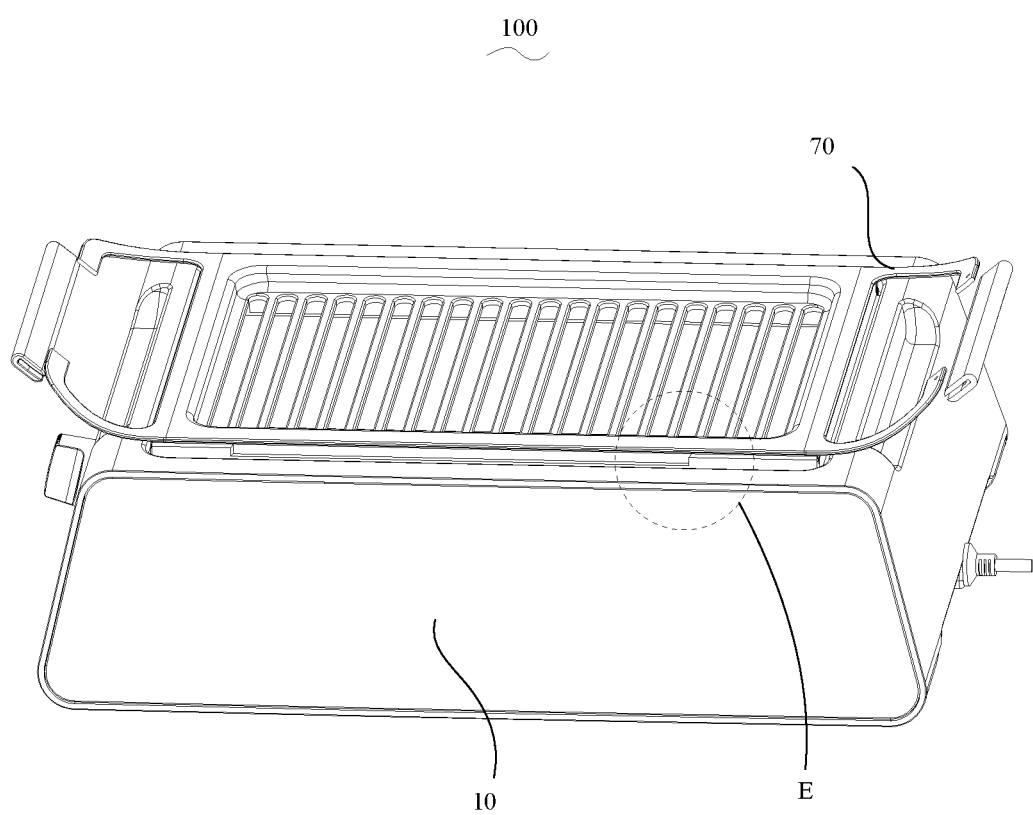
FIG. 6 is still another perspective view of the electric roasting machine shown in FIG. 1 from another perspective.
Figure 7:
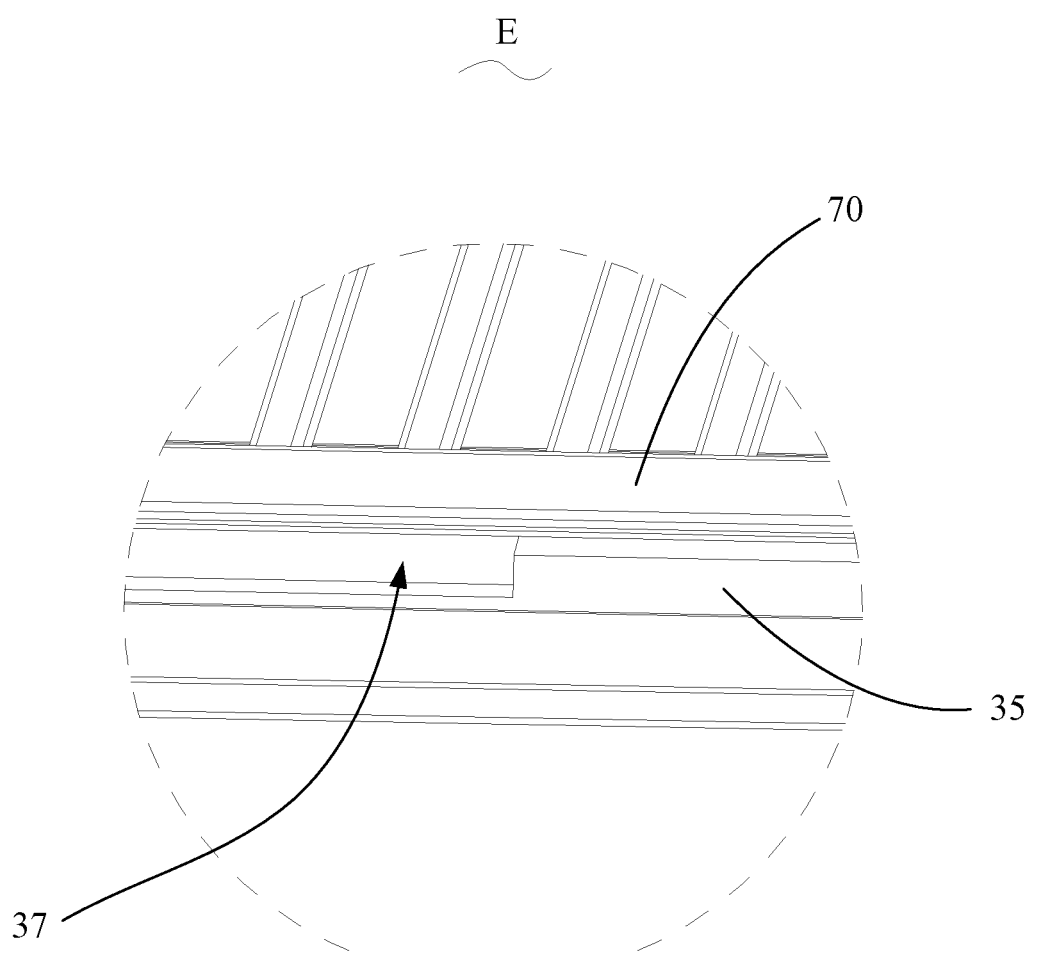
FIG. 7 is an enlarged schematic view of the portion marked with "E" of the electric roasting machine shown in FIG. 6.

Further, in order to reduce the temperature of the outer housing 10, please refer to FIGS. 6 and 7. In this application, the inner housing 30 also includes a grill supporting part 35 at the second avoiding opening, and the upper end surface of the grill supporting portion 35 is higher than the upper end surface of the outer housing 10.

According to the technical solution of the present application, the grill supporting portion 35 is formed at a plate body connected with the horizontal section 32 of the inner housing 30. The upper end surface of the grill support part 35 is configured to be higher than the upper end surface of the outer housing 10, and hence the side edge of the grill 70 is higher than the outer housing 10 when the grill 70 of the electric roasting machine 100 is supported at the grill supporting portion 35. Thereby, the side edge of the grill 70 may not contact the outer housing 10 even if the grill 70 moves during the roasting process, so as to effectively prevent the outer housing 10 of the electric roasting machine 100 from being scalded by the grill 70 with high temperature, and ensure the structural integrity of the electric roasting machine 100.

The electric roasting machine 100 includes a plurality of grill supporting portions 35, which are arranged at intervals and surround the second avoiding opening, and an airflow passage 37 is formed between two adjacent grill supporting portions 35.

Specifically, in this embodiment, the second avoiding opening is substantially rectangular, four grill supporting portion 35 are provided and distributed at the four corners of the second avoiding opening. Thereby, the four corners of the grill 70 are supported, and the stability and use safety of the grill 70 supported on the grill support portion 35 are improved. And, an air flow passage 37 is formed between two adjacent grill supporting portions 35, so as to facilitate the discharge of the hot air with smoke generated in the inner case 30. In addition, the grill support part 35 can be configured in a way that further saves materials to reduce cost.

In the present application, the height difference between the upper end surface of the grill supporting portion and the upper end surface of the outer housing is greater than 0 and less than or equal to 10 millimeters. The preferred height difference may be greater than 3 millimeters, less than or equal to 10 mm. Thereby, the structural integrity of the electric roasting machine 100 may be effectively ensured, and the position of the grill 70 is appropriate so as to prevent the heat of the inner housing 30 from transferring to the grill 70, and no material waste is caused for over-high supporting the grill 7. Additionally, the whole electric roasting machine 100 may have a better appearance, and a user is less likely to touch the inner housing 30 with higher temperature when holding the grill 70 during use, making the electric roasting machine 100 safer for use.

Figure 5:
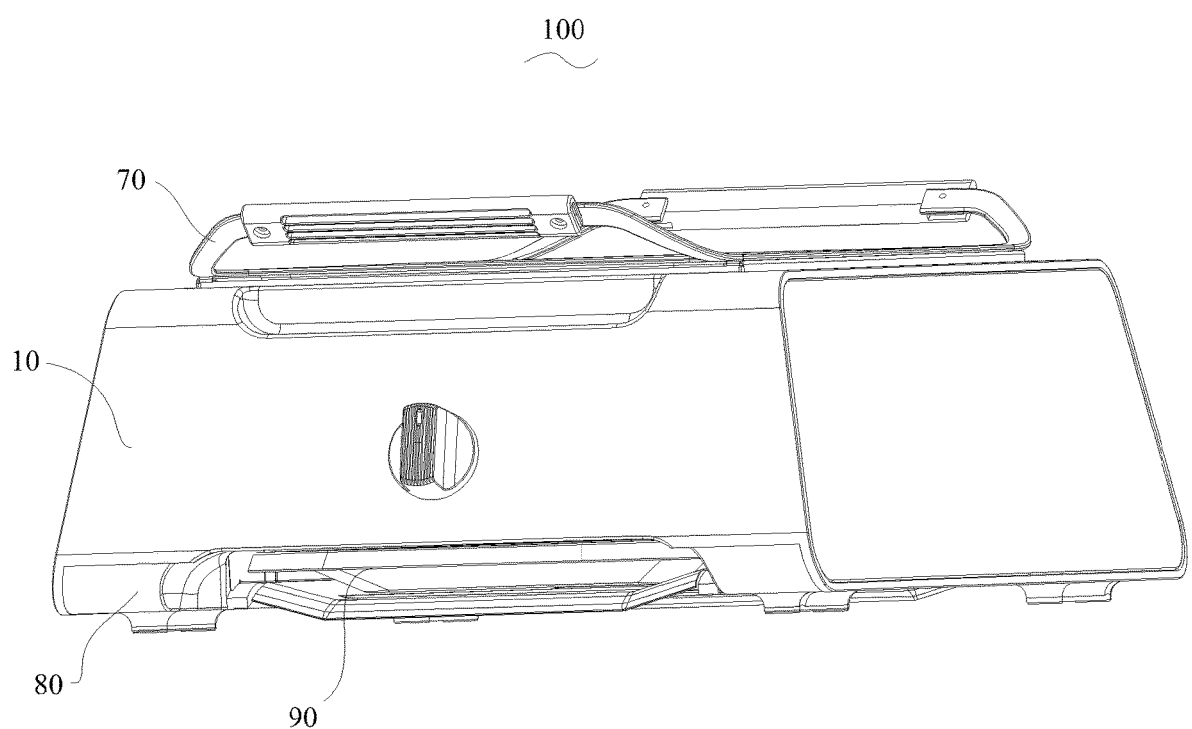
FIG. 5 is another perspective view of the electric roasting machine shown in FIG. 1 from a different perspective.

Referring to FIGS. 3 and 5, the oil drip pan 90 is located directly below the grill 70, and the projection area of the oil drip pan 90 on the horizontal plane is approximately equal to the projection area of the grill 70 on the horizontal plane, so as to improve the oil receiving effect of the oil drip pan 90. In this way, all the oil, moisture and the like dropped from the food on the grill 70 may directly drop onto the oil drip pan 90. The oil drip pan 90 is slidably connected with the bottom housing 80. To achieve a slidable connection between the oil drip pan 90 and the bottom housing 80, sliding chutes are arranged on both sides of the bottom housing 80, and peripheries of both sides of the oil drip pan 90 are embedded in the sliding chutes, and the bottom of the housing 10 includes an opening, the end of the oil drip pan 90 is positioned at the opening. A user may push or pull the end of the oil drip pan 90 to make the oil drip pan 900 enter or exist the accommodating cavity 31, so that the cleaning of the electric roasting machine 100 is simple and convenient.

The above are only preferred embodiments of the present application, and are therefore not intended to limit the scope of the patent application. Any equivalent structural change made under the inventive concept of the present application using the contents of the present application specification and drawings, or direct/indirect application in other related technical fields, is included in the scope of the patent protection of the present application.

What is claimed is:

1. An electric roasting machine comprising:
    an outer housing comprising a cover section and an inclined section connected with each other;
    a heating device accommodated in the outer housing; and
    an inner housing between the outer housing and the heating device, the inner housing comprising a horizontal section and a bent section connected with each other;

wherein:
    a heat insulating cavity is formed between the inner housing and the heating device;
    a heat dissipating passage is formed between the outer housing and the inner housing;
    the horizontal section is configured to face the cover section and the bent section is configured to face the inclined section; and
    a distance between the horizontal section and the cover section is smaller than a distance between the bent section and the inclined section.

2. The electric roasting machine according to claim 1, wherein the heating device is located within a height range of the heat insulating cavity.

3. The electric roasting machine according to claim 1, wherein the heat insulating cavity has a closed upper end and is formed by metal material.

4. The electric roasting machine according to claim 1, wherein the heating device comprises:
    a reflecting cover forming a reflecting cavity; and
    a radiant heat source installed in the reflecting cover and positioned in the reflecting cavity, an outer wall of a side of the reflecting cover away from the radiant heat source cooperating with the inner housing to form the heat insulating cavity.

5. The electric roasting machine according to claim 4, wherein a surface of the inner housing facing the reflecting cover is coated with a reflecting layer, the reflecting layer including a galvanized layer or an aluminized layer.

6. The electric roasting machine according to claim 4, wherein:
    the reflecting cavity includes an avoiding opening; and
    the heating device further comprises a protecting window covering the avoiding opening and cooperating with the reflecting cover to form a closed space.

7. The electric roasting machine according to claim 4, wherein:
    the inner housing comprises two long sides; and
    the heating device is a first heating device arranged at one of the long sides extending along a length direction of the one of the long sides;
    the electric roasting machine further comprising:
    a second heating device arranged at another one of the long sides and extending along a length direction of the other one of the long sides.

8. The electric roasting machine according to claim 1, wherein an upper end of the heat dissipating passage includes an air outlet.

9. The electric roasting machine according to claim 1, wherein a distance between the outer housing and the inner housing is within a range from 3 millimeters to 30 millimeters.

10. The electric roasting machine according to claim 1, wherein an included angle between the inclined section and a vertical plane is within a range from 5 degrees to 30 degrees.

11. The electric roasting machine according to claim 1, further comprising:
    a bottom housing connected with and covering a lower end of the outer housing and a lower end of the inner housing, the bottom housing including an air inlet communicating with the heat dissipating passage;
    wherein an upper end of the outer housing includes an air outlet communicating with the heat dissipating passage.

12. The electric roasting machine according to claim 11, wherein the air outlet is located at one side of the outer housing close to the inner housing.

13. The electric roasting machine according to claim 11, wherein a cross-sectional area of the heat dissipating passage near the air inlet is larger than a cross-sectional area of the heat dissipating passage near the air outlet.

14. The electric roasting machine according to claim 11, wherein the air inlet is one of a plurality of air inlets below the heating device, the plurality of air inlets being arranged at intervals along a length direction of the heating device, and a projection of a range of arrangement of the plurality of air inlets on a horizontal plane at least partially overlapping with a projection of the heating device on the horizontal plane.

15. The electric roasting machine according to claim 14, wherein a ratio of a length of the range of arrangement of the plurality of air inlets to a length of the heating device is larger than or equal to 0.5 and smaller than or equal to 1.1.

16. The electric roasting machine according to claim 1, wherein an avoiding opening is formed at an upper end of the inner housing;
the electric roasting machine further comprising:
a grill supported at and being partially accommodated in the avoiding opening.

17. The electric roasting machine according to claim 16, wherein the inner housing includes a grill supporting portion at the avoiding opening, an upper end surface of the grill supporting portion being higher than an upper end surface of the outer housing.

18. The electric roasting machine according to claim 17, wherein the grill supporting portion is one of a plurality of grill supporting portions of the inner housing, the plurality of grill supporting portions being arranged at intervals and surrounding the avoiding opening, and an airflow passage being formed between two adjacent ones of the plurality of grill supporting portions.

19. The electric roasting machine according to claim 16, further comprising:
an oil drip pan arranged directly below the grill, a projection area of the oil drip pan on a horizontal plane being approximately equal to a projection area of the grill on the horizontal plane.

* * * * *